Jan. 12, 1965 E. E. HUGHES 3,165,689
STORAGE BATTERY DEVICE FOR STARTING VEHICLES
Filed Aug. 3, 1960 2 Sheets-Sheet 1

INVENTOR.
ELROY E. HUGHES
BY
Huebner & Worrel
ATTORNEYS.

Jan. 12, 1965          E. E. HUGHES          3,165,689
STORAGE BATTERY DEVICE FOR STARTING VEHICLES
Filed Aug. 3, 1960          2 Sheets-Sheet 2
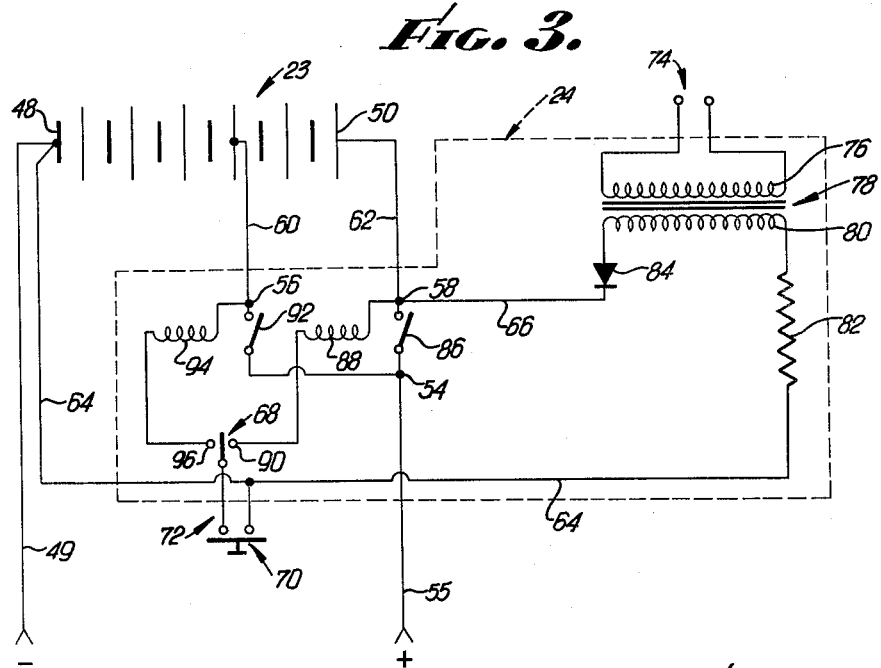
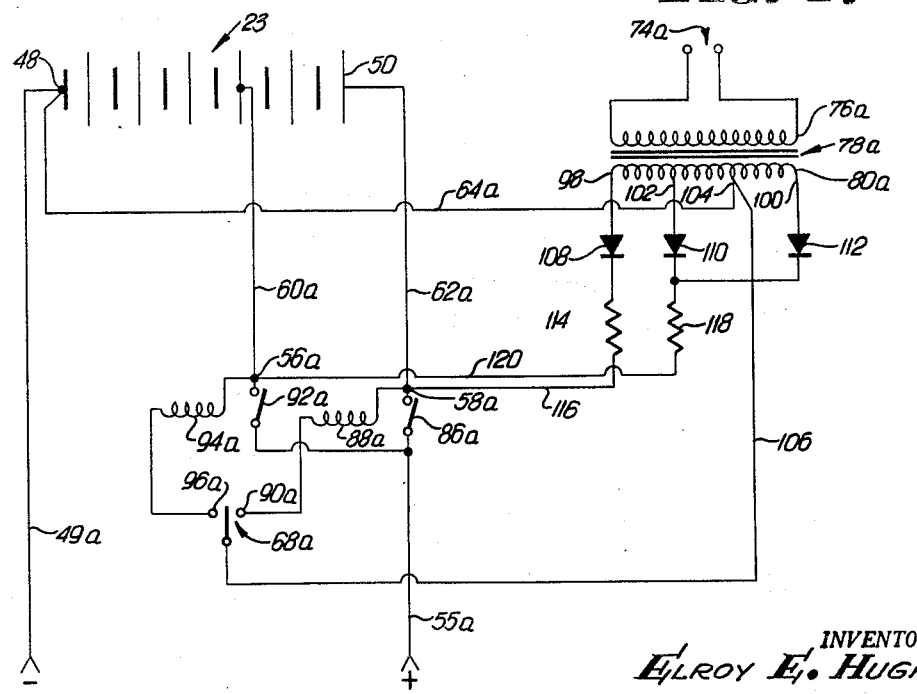
INVENTOR.
ELROY E. HUGHES
BY Huebner & Worrel
ATTORNEYS.

United States Patent Office 3,165,689
Patented Jan. 12, 1965

3,165,689
STORAGE BATTERY DEVICE FOR
STARTING VEHICLES
Elroy E. Hughes, 3739 N. Land Drive,
Los Angeles 8, Calif.
Filed Aug. 3, 1960, Ser. No. 47,291
2 Claims. (Cl. 320—18)

The present invention relates to storage batteries, and it relates particularly to a novel storage battery device adapted for use in an auxiliary or supplemental capacity for starting a vehicle having either a 6-volt or a 12-volt battery, where the vehicle battery is either "dead" or is too low to provide the necessary current for starting the vehicle engine.

In the servicing of automobiles and other vehicles, both on the road and in garages or service stations, it is frequently necessary to temporarily connect an auxiliary battery to the vehicle battery or starting circuit, in order to provide the current required for starting the vehicle engine.

Both 6-volt and 12-volt vehicle batteries are currently in wide usage. This requires that any servicing truck which goes out on the road to service vehicles, or any garage or service station, have both a 6-volt and a 12-volt battery on hand for use as auxiliary starting batteries, which is an undesirable and expensive duplication.

Another problem in connection with the use of conventional 6 and 12-volt batteries in an auxiliary or supplemental capacity for starting a vehicle engine where the vehicle battery is low or "dead" is that such supplemental or auxiliary batteries are not connected in with any generator circuit and therefore, from time to time, must be connected to a battery charging device. Such battery charging devices are normally rather heavy, expensive pieces of equipment, and it is often inconvenient to have to charge the auxiliary or supplemental batteries in this manner. Also, such battery charging devices usually apply a rather heavy charging current to the battery, which is too high for the state of charge condition of the battery, and also normally will not bring the battery up to its completely charged condition.

A further problem in connection with the use of conventional 6- and 12-volt batteries as auxiliary starting batteries is that such ordinary batteries cannot be connected into and disconnected from the vehicle starting circuit by a service man who is sitting inside the vehicle at the vehicle controls, so that two service men are often required for starting a vehicle.

In view of these and other problems in the art, it is an object of the present invention to provide a storage battery device for use in an auxiliary or supplemental capacity for starting a vehicle, wherein a single pair of output or booster cables may be clamped onto the vehicle battery terminals or at appropriate places in the vehicle starting circuit, the device including a 12-volt storage battery and suitable switching and circuit means for providing either a relatively high voltage output to the booster cables for 12-volt vehicle systems or, alternatively, a relatively low voltage output to the booster cables for 6-volt vehicle electrical systems.

Another object of the present invention is to provide a booster storage battery device of the character described which includes remote momentary contact switching means so that booster output cables of the device can be clamped to the vehicle battery terminals or starting circuit in either 6-volt or 12-volt vehicle systems, and output of the auxiliary or supplemental battery can be controlled from a remote point, such as from within the vehicle.

Another object of the present invention is to provide a booster storage battery device for use in an auxiliary or supplemental capacity for starting a vehicle having either a 6-volt or a 12-volt electrical system, wherein the auxiliary or supplemental battery includes six two-volt electrical cells, and a seventh cell which contains switching means for providing a relatively high output voltage for 12-volt vehicle electrical systems or a relatively low output voltage for 6-volt electrical systems, the seventh cell also containing a battery maintainer unit like that shown and described in my co-pending application Serial No. 15,413, filed March 16, 1960, for a "Battery Maintainer," this maintainer unit being connectable to a standard alternating current line source when the booster device is not in operation, so as to provide a continuous, relatively low amperage charging current to the booster battery for charging the booster battery and for maintaining it in a fully-charged condition.

Further objects and advantages of the invention will appear during the following part of this specification, wherein the details of construction and the mode of operation of a preferred embodiment are described with reference to the accompanying drawings, in which:

FIG. 3 is a wiring diagram of the presently preferred electrical circuit employed in the present invention, including the maintainer and switching components thereof; and FIG. 4 is a wiring diagram of an alternative circuit which may be employed in connection with the present invention.

Figure 1:
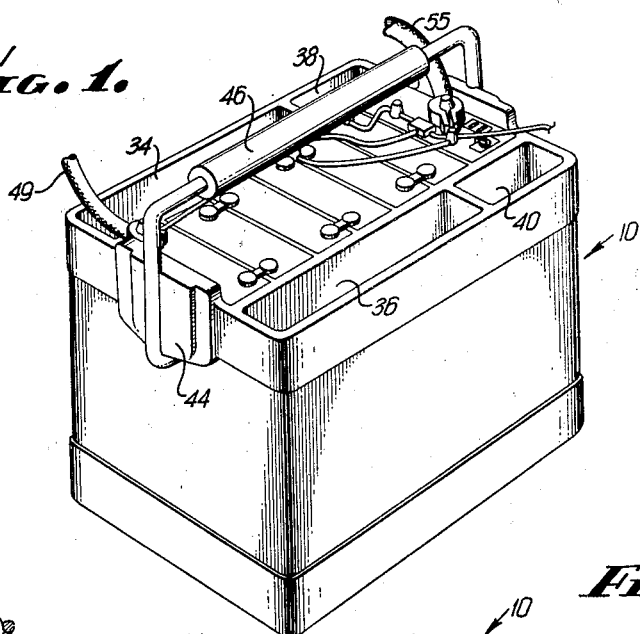
FIG. 1 is a perspective view illustrating a presently preferred embodiment of the invention.
Figure 2:
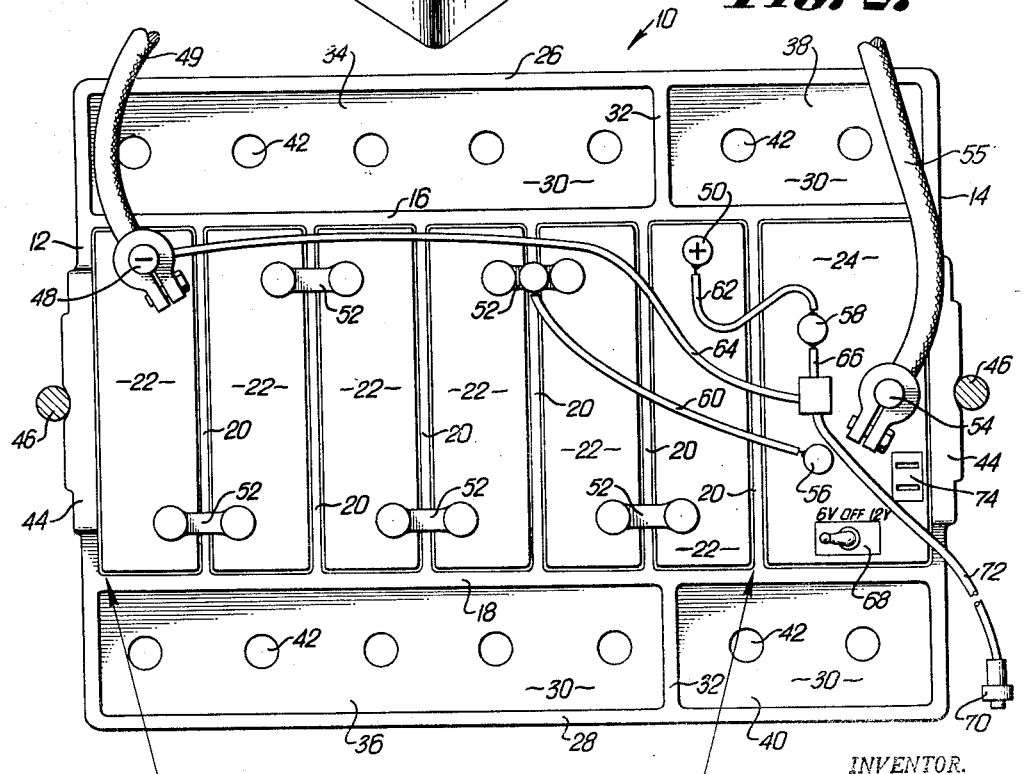
FIG. 2 is a top plan view of the device shown in FIG. 1.

Referring to the drawings, and at first particularly to FIGS. 1 and 2 thereof, the presently preferred case 10 for my auxiliary storage battery device includes a pair of parallel upright end walls 12 and 14, and a pair of parallel longitudinal upright walls 16 and 18 which extend between the end walls 12 and 14. Disposed between the end walls 12 and 14, and extending transversely from longitudinal wall 16 to longitudinal wall 18, are six upright separator walls 20, which define seven receptacle portions of the case 10. Six of these receptacle portions of the case 10 contain, respectively, six battery storage cells 22 which are each conventional two-volt cells, together comprising a 12-volt battery 23.

The seventh receptacle or cell, adjacent the end wall 14, is preferably, but not necessarily, somewhat wider than the other six cells, and contains a battery maintainer unit 24 which is similar to the battery maintainer shown and described in my co-pending application Serial No. 15,413, filed March 16, 1960, for "Battery Maintainer" now abandoned. The unit 24 which is hereinafter referred to generally as the "battery maintainer unit" actually contains additional switching circuitry over and above that shown and described in my said co-pending application Serial Number 15,413, this circuitry being illustrated schematically in FIGS. 3 and 4 and being described in detail hereinafter.

The case 10 further includes a pair of longitudinally-arranged upright side walls 26 and 28 which are spaced outwardly from the respective longitudinal walls 16 and 18 and which terminate at the respective end walls 12 and 14. The entire case 10 as defined between end walls 12 and 14 and side walls 26 and 28 is provided with a bottom wall 30. The storage region defined between the end walls 12 and 14 and between side wall 26 and longitudinal wall 16 on one side of the case, and side wall 28 and longitudinal wall 18 in the other side of the case, are divided by means of transverse divider walls 32, thus to provide a pair of relatively long booster cable storage compartments 34 and 36 on opposite sides of the case 10 adjacent end wall 12, and a pair of shorter storage compartments 38 and 40 adjacent end wall 14 for leads or wires which extend from or are connected to the maintainer unit 24 at that end of the case.

A plurality of drainage openings 42 are provided through bottom wall 30 in the bottoms of storage compartments 34, 36, 38 and 40, so that moisture and dirt will not collect in the storage compartments.

The case 10 is further preferably provided with reinforcements 44 at the upper edges of end walls 12 and 14 for supporting handle means 46 which extends longitudinally over the top of the case for carrying purposes. Any suitable handle means may, of course, be employed.

A conventional negative battery terminal 48 extends upwardly out of the end storage cell 22 adjacent end wall 12, and negative booster output cable 49 is conventionally attached to the negative terminal 48. Negative booster cable 49 is provided with a suitable clamp at its free end, this clamp being diagrammatically shown in FIG. 3.

The battery storage cell 22 at the other end of the battery portion 23, adjacent maintainer unit 24, has conventional positive battery terminal 50 extending upwardly therefrom. The battery portion 23 of the device also includes conventional external jumper bars 52 which electrically connect the adjacent storage cells 22 to each other.

A positive output stud 54 extends upwardly from the maintainer unit 24, and positive booster output cable 55 is connected to stud 54 in a conventional manner. The positive booster cable 55 includes a clamp at its free end, as diagrammatically illustrated in FIG. 3.

The maintainer unit 24 also includes 6-volt maintainer input stud 56 and 12-volt maintainer input stud 58. A jumper cable 60 is connected to the 6-volt maintainer input stud 56, and also to the battery jumper bar 52 which connects the fourth and fifth cells of the battery, which is at an electrical potential of 8 volts above the negative battery terminal 48. The jumper cable 60 is connected to the 6-volt maintainer input stud 56 for providing electricity for starting 6-volt vehicle systems, but is tapped into the battery at the 8-volt point so as to provide a slightly higher voltage than is actually required, for more powerful starting operation. The full 12 volts of the battery could not be employed for 6-volt systems without likelihood of serious damage to the system, but 8 volts, when only applied for short intervals of time, is not harmful.

A jumper cable 62 is connected to the 12-volt maintainer input stud 58 and also to the positive battery terminal 50, for providing a 12-volt potential for use in starting 12-volt vehicle systems.

A negative maintainer lead 64 connects the maintainer unit 24 to the negative battery terminal 48, and a positive maintainer lead 66 connects the maintainer unit 24 to the 12-volt maintainer input stud 58, the electrical connections of the negative and positive maintainer leads 64 and 66, respectively, into the circuit of the maintainer unit 24, being explained hereinafter in connection with the wiring diagram of FIG. 3.

The maintainer unit 24 is also provided with a control switch 68 having three positions: an "off" position, a "6-volt" position and a "12-volt" position, these positions adapting the device for its inoperative condition or for use in connection with 6-volt or 12-volt vehicle systems, respectively.

The maintainer unit 24 is also provided with a momentary contact switch 70 which is physically remote from the device during operation, and which is connected to the maintainer unit 24 by means of momentary contact switch lead 72.

The external parts of maintainer unit 24 are completed by an alternating current input connector member 74 to permit electrical connection of the maintainer unit 24 to a standard alternating current line source to provide charging and maintaining power for the battery. An ordinary extension cord can be employed for this purpose.

The storage compartments 34 and 36 provide convenient receptacles for housing the booster output cables 49 and 55 when the device is not in operation, while the smaller storage compartments 38 and 40 provide convenient receptacles for housing the momentary contact switch 70 and lead 72, and a cord and plugs for connecting the A.C. input connector member 74 with a standard alternating current line source.

Referring now particularly to FIG. 3 of the drawings, this figure is a wiring diagram illustrating a presently preferred circuit for the apparatus shown in FIGS. 1 and 2.

Referring at first to the portion of the circuit in FIG. 3 employed for charging and maintaining the charge of the battery, the two terminals of the alternating current input connector member 74 are electrically connected to opposite sides of the primary winding 76 of a transformer 78 which forms a part of the maintainer unit 24. The secondary winding 80 of transformer 78 is electrically connected at one side thereof through a current limiting resistor 82 and the negative maintainer lead 64 to the negative terminal 48 of battery 23. The other side of secondary winding 80 is connected through rectifying diode 84, which is preferably a semi-conductor type of rectifier, and through positive maintainer lead 66, 12-volt maintainer input stud 58 and jumper cable 62 to the positive battery terminal 50.

It will be apparent that when the alternating current into connector member 74 is electrically connected to a standard alternating current line source, an alternating current voltage will be induced in the secondary winding 80 and will be rectified by diode 84 so as to provide charging current to battery 23. The transformer secondary winding 80 may have fewer turns than primary winding 76 so as to provide a reduced alternating current voltage. Although the secondary voltage is not in any way critical, it has been found in practice that a primary-secondary ratio such as to provide about 24 volts across the secondary winding is suitable.

Similarly, the value of current limiting resistor 82 is not in any way critical, and its value may vary depending upon the amount of use that the unit is likely to receive. Where the unit is not extensively used, it may be desirable to provide a very low charging current, on the order of from about 35 to about 65 milliamperes of charging current to the battery, with the preferred charging current about 50 milliamperes. With such a low charging current, the device may be connected to a standard alternating current line power source whenever the device is idle, and the low charging current will have the various advantages set forth in my said co-pending application, Serial No. 15,413, now abandoned of bringing the battery to a complete charge and of prolonging the life of the battery and keeping the battery warm. If desired, the resistor 82 may have a positive temperature coefficient which would improve the current limiting action.

Referring now to the switching means forming a part of the present invention, this switching means is such that by properly positioning the control switch 68 to either its 12-volt or its 6-volt position, and by actuation of the momentary contact switch 70, the positive booster output cable 55 may be electrically connected alternatively either to the 12-volt or to the 8-volt potential points of the battery 23.

Tracing through this circuit, the positive booster output cable 55 is electrically connected through a normally open solenoid actuated switch 86 to the 12-volt maintainer input stud 58 and thence through jumper cable 62 to the positive battery terminal 50. The solenoid actuated switch 86 is controlled by solenoid coil 88 which is connected at one side to the 12-volt maintainer input stud 58 and at its other side to a terminal 90 of control switch 68. The control switch 68 is electrically connected through the momentary contact lead 72 and momentary contact switch 70 to the negative maintainer lead 64, so that when the control switch 68 is in its 12-volt position and momentary contact switch 70 is actuated, 12 volts will be applied across solenoid coil 88 so as to actuate the solenoid switch 86 and thereby apply 12 volts from the battery to positive booster output cable 55.

The positive booster output cable 55 is also connected through positive output stud 54 and a second solenoid actuated switch 92 and 6-volt maintainer input stud 56 and jumper cable 60 to the 8-volt position of battery 23. The solenoid switch 92 is actuated by a solenoid coil 94 which will be energized by 8 volts from the battery when the control switch 68 is on the 6-volt position and momentary contact switch 70 is actuated. The solenoid coil 94 is connected at one side to the 6-volt input stud 56 so as to receive 8 volts from the battery, and at its other side to a terminal 96 of control switch 68.

It will thus be seen that whenever the device is to be employed as a booster battery for a 12-volt vehicle electrical system, all that is required to clamp the negative and positive booster output cables 49 and 55, respectively, to the vehicle battery terminals or starting circuit, adjust the control switch 68 to the 12-volt position, and then actuate the momentary contact switch 70 so as to energize solenoid coil 88 and thus actuate solenoid switch 86 and provide 12 volts to the system. On the other hand, if the vehicle electrical system is a 6-volt system, all that is required is to connect the booster output cables 49 and 55 to the system, adjust the control switch 68 to the 6-volt position, and then when the operator is ready to start the vehicle, to actuate the momentary contact switch 70 so as to energize solenoid coil 94 and thereby close the solenoid switch 92 and provide 8 volts to the system.

In FIG. 4 of the drawings I have illustrated a somewhat different electrical circuit which contemplates more extensive use of the device in connection with 6-volt systems than with 12-volt systems, and hence which provides a heavier charging current to the 8-volt section of the battery than to the remaining additional 4-volt section. The circuit shown in FIG. 4 does not include a momentary contact switch, as this is believed adequately illustrated in connection with the circuit of FIG. 3.

In FIG. 4, the alternating current input connector member 74a receives alternating current line power and applies it across the primary winding 76a of transformer 78a. The secondary winding 80a of transformer 78a is provided at its opposite ends with respective transformer secondary, end taps 98 and 100, and the secondary 80a is also provided with a pair of intermediate secondary taps 102 and 104.

The section of secondary winding 80a from intermediate tap 102 to end tap 100 is utilized as a component of a full wave rectifier for charging the 8-volt portion of battery 23, while that portion of the secondary winding from end tap 98 to intermediate tap 104 is employed as a half-wave rectifier for the entire battery 23.

Three rectifying diodes, 108, 110 and 112 are employed to accomplish this. An electrical connection is provided from end tap 98 through rectifying diode 108 and current limiting resistor 114, and thence through a conductor 116 to the 12-volt maintainer input stud 58a, and thence through jumper cable 62a to the positive battery terminal 50, thus to provide half-wave rectified charging current to the entire battery 23.

One side of diode 110 is connected to secondary tap 102, and one side of diode 112 is connected to secondary end tap 100, and the other sides of both of these diodes 110 and 112 are connected through current limiting resistor 118 and conductor 120 to 6-volt maintainer input stud 56a, which is connected through jumper cable 60a to the 8-volt position of battery 23, thus providing full wave rectified current to that portion of battery 23 between the negative terminal 48 and the 8-volt point of the battery.

The switching arrangement of the wiring diagram in FIG. 4 is generally similar to that of the wiring diagram in FIG. 3, except for the omission of the momentary contact switch 70 and its lead 72. Thus, when the control switch 68a (which functions in FIG. 4 as a momentary contact, center-off, switch) is moved to its 12-volt position, it will apply 12 volts across solenoid coil 88a, thus actuating solenoid switch 86a to provide 12 volts to the positive booster output cable 55a. Conversely, when the control switch 68a is moved to the 6-volt position, it will cause 8 volts to be applied across solenoid coil 94a, thus actuating solenoid switch 92a, so as to apply 8 volts to the positive booster output cable 55a.

It is to be noted that although the control switches 68 and 68a have been shown as mounted directly on the maintainer unit 24, the control switches 68 and 68a, if desired, be remotely positioned and connected through suitable leads.

It is also to be noted that the present invention contemplates reversal of the polarity of the battery terminals where desirable.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

Having thus described my invention, what I claim as new and desire to secure by Letters Patent is:

1. A storage battery device for use as an auxiliary source of power for starting vehicles which comprises: a storage battery having a negative terminal and a positive terminal and having intermediate outlet means at an electrical potential intermediate the potentials of the negative and positive terminals; a negative output cable connected to said negative battery terminal; a positive output cable; switching circuit means connected to said positive output cable, and to said positive battery terminal and said intermediate outlet means, said switching circuit means being selectively operable in one position thereof to electrically connect said positive output cable to said positive battery terminal for use of the device in connection with high voltage electrical systems, and in another position thereof to electrically connect said positive output cable with said intermediate outlet means for use of the device in connection with low voltage electrical systems, said switching circuit means including a first circuit portion connecting said positive battery terminal with said positive output cable, a second circuit portion connecting said intermediate outlet means with said positive output cable, a first normally open solenoid-actuated switch in said first circuit portion, and a second normally open solenoid-actuated switch in said second circuit portion, and control switch means for selectively electrically connecting each of said solenoid-actuated switches to said storage battery.

2. A storage battery device for use as an auxiliary source of power for starting vehicles which comprises: a rectangular case having a bottom wall and longitudinal side walls and transverse end walls, and having a plurality of transverse separator walls extending between said side walls so as to divide the case into a plurality of receptacle portions of the case; a plurality of storage cells disposed in respective receptacle portions of the case, said cells being electrically connected in series so that in combination the cells comprise a storage battery; a negative terminal and a positive terminal on said storage battery, and intermediate outlet means on said storage battery at an electrical potential intermediate the potentials of the negative and positive terminals; a pair of output cables, one cable being connected to one of said battery terminals; and a battery maintainer and switching unit disposed in one of said receptacle portions of the case, said unit including electrical switching means electrically connected to the other cable, and to the other battery terminal and said intermediate outlet means, said swtiching means being selectively operable in one position thereof to electrically connect said other cable with said other battery terminal for use of the device in connection with high voltage electrical systems, and in another position thereof to electrically connect said other cable with said intermediate outlet means for use of the device in connection with low voltage electrical systems; said unit also including a battery maintainer comprising electrical input means for receiving electrical power from an alternating current power source, three maintainer output conductors connected to said storage battery so as to provide charging current to said storage battery, two of the conductors being electrically connected to the respective storage battery terminals and the third conductor being connected to said intermediate storage battery outlet means, and electrical circuit means connected between said maintainer input means and said maintainer output conductors for reducing the voltage and rectifying the current provided to the maintainer from said alternating current power source, said circuit means including current limiting means for limiting the amount of charging current provided to the storage battery, a voltage-reducing transformer having primary and secondary windings, said primary winding being connected to said electrical input means and rectifying means connected to said transformer secondary winding and to said three conductors so as to provide greater charging current to a portion of the storage battery between one battery terminal and said intermediate battery outlet means than between the other battery terminal and said intermediate outlet means.

References Cited in the file of this patent
UNITED STATES PATENTS 1,795,563    Klock _____ Mar. 10, 1931

FOREIGN PATENTS 175,088    Great Britain _____ Feb. 16, 1922